UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

HALOGENATED RED DYE AND PROCESS OF MAKING SAME.

No. 848,354.     Specification of Letters Patent.     Patented March 26, 1907.

Application filed January 9, 1907. Serial No. 351,442.

*To all whom it may concern:*

Be it known that I, GADIENT ENGI, chemist and doctor of philosophy, a citizen of the Swiss Republic, and a resident of Basel, Switzerland, have invented new and useful Halogenated Red Vat-Dyeing Dyestuffs and a Process for the Manufacture of the Same, of which the following is a full, clear, and exact specification.

In the United States Letters Patent No. 831,844, dated September 25, 1906, I have described the manufacture of a red vat-dyeing dyestuff, by heating salicylthioacetic acid

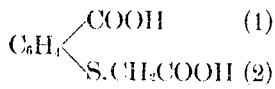

with an aromatic nitrohydrocarbon. Since I have found that dyestuffs more fast to washing and dyeing yellower red tints and constituting, consequently, more valuable products can be obtained if in the process of the said Letters Patent No. 831,844 the salicylthioacetic acid is replaced by its halogenated derivatives containing the halogene in the position "para" relatively to the carboxylic group—as, for instance, metachlorsalicylthioacetic acid—

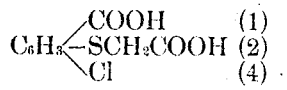

or metabromsalicylthioacetic acid

These compounds can be prepared by diazotizing 4-chlor-(or brom) -2-amido-1-benzoic acid, combining the resulting diazo derivative with thioglycollic acid and decomposing finally the so-obtained diazothioether. The transformation of the so-obtained halogenated salicylthioacetic acids into dyestuffs is effectuated in the manner described for the salicylthioacetic acid in Letters Patent No. 831,844.

Example: ten parts, by weight, of chlorsalicylthioacetic acid

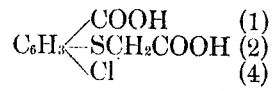

are heated with fifty parts of nitrobenzene, during three to five hours in a reflux apparatus, in an oil bath, at 225° to 228° centigrade, (temperature of the oil-bath.) From the cooled mass of reaction the dyestuff is separated by filtration. It is washed on the filter with alcohol and dried. This dyestuff constitutes a reddish crystalline powder, which is very difficultly soluble in the usual organic solvents, as alcohol, ether, and chloroform. Its solution in warm benzene shows a bluish-red coloration and a yellow-pale fluorescence. In boiling nitrobenzene it dissolves with a lively red coloration. Its solution in concentrated sulfuric acid has a green coloration, and on addition of water to this solution the unchanged dyestuff separates in form of bright red flocks. In fuming sulfuric acid the new dyestuff dissolves even in the cold with a red coloration and with formation of a sulfonic acid. When made into a vat with the usual reducing agents, particularly with caustic-soda lye and sodium-hydrosulfite, the dyestuff yields a bright gold-yellow vat from which the different textile fibers are dyed in clear red tints, which are much yellower and faster to washing than those obtained with the dyestuff derived from the not halogenated salicylthioacetic acid.

If in the foregoing example the chlorsalicylthioacetic acid is replaced by the corresponding brom derivative, the resulting dyestuff offers analogous properties.

What I claim is—

1. The described process for the manufacture of red vat-dyeing dyestuffs by heating the metahalogenated salicylthioacetic acid

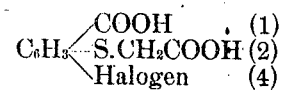

with aromatic nitrohydrocarbons.

2. As a new article of manufacture, the herein-described yellowish red, vat-dyeing dyestuff constituting a reddish crystalline powder, very difficultly soluble in alcohol, ether and chloroform, soluble in warm benzene with a bluish-red coloration and a yellowish-pale fluorescence, soluble in boiling nitrobenzene with a lively red coloration, soluble in concentrated sulfuric acid with a green coloration and soluble in fuming sulfuric acid with a red coloration.

In witness whereof I have hereunto signed my name, this 19th day of December, 1906, in the presence of two subscribing witnesses.

GADIENT ENGI.

Witnesses:
 GEO. GIFFORD,
 AMAND RITTER.